United States Patent Office 3,293,994
Patented Dec. 27, 1966

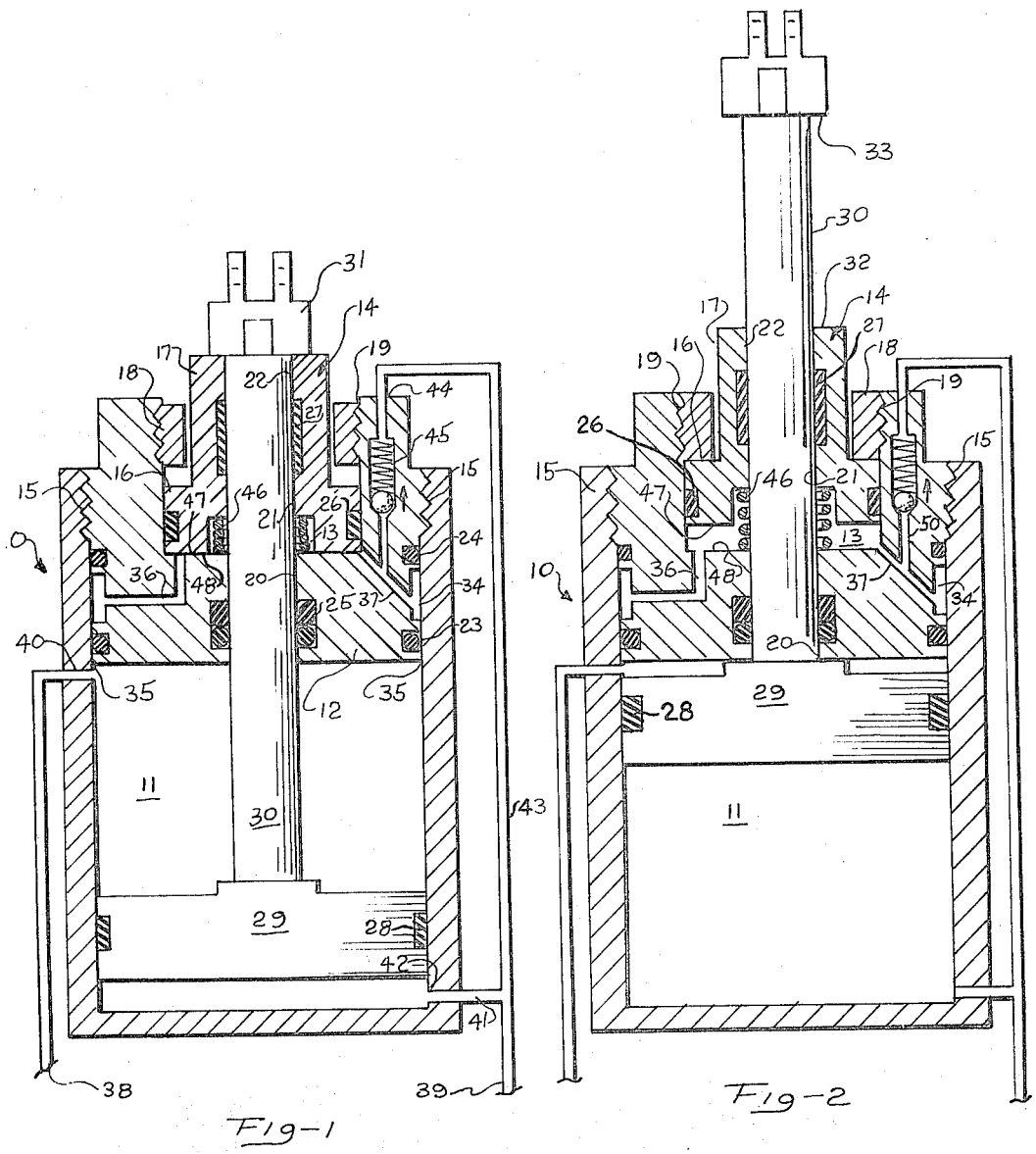

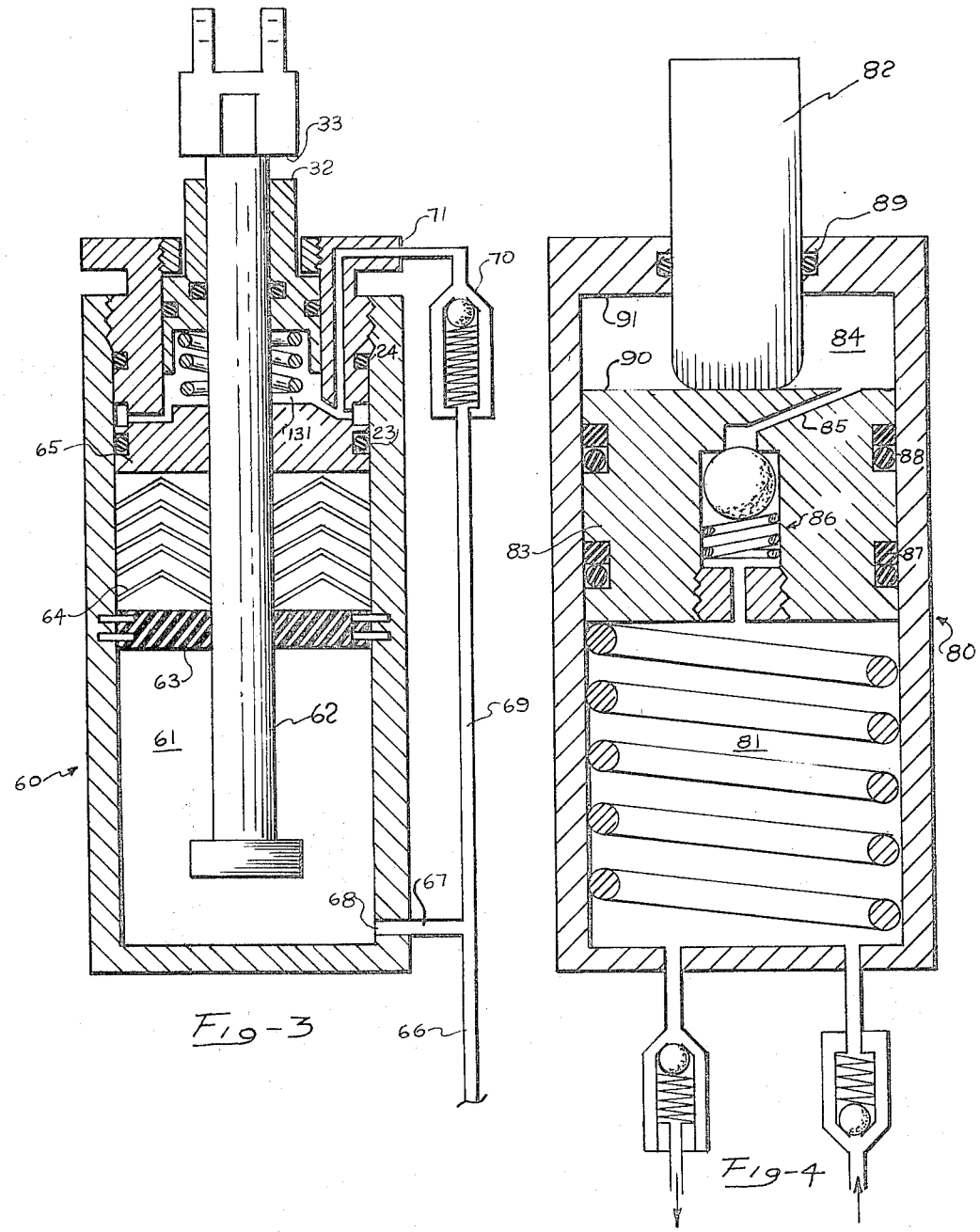

3,293,994
NON-LEAK PISTON SYSTEM
Pellegrino E. Napolitano, 1415 57th St.,
Brooklyn, N.Y. 11227
Filed Nov. 27, 1964, Ser. No. 414,189
6 Claims. (Cl. 92—86)

This invention relates to seal constructions for piston rods and pistons of hydraulically operated devices such as hydraulic pumps and lifts, and in particular, relates to such piston seal constructions which are designed to prevent loss through leakage of the hydraulic fluid from the hydraulic system.

Hydraulic devices of many types are actuated by fluid pressure, using a fluid such as oil or water or any other fluid, in conjunction with an apparatus comprising a pump, an actuating cylinder with a piston and a piston rod, and usually a reservoir for storing the fluid used in the system. There are actuating cylinders of all types, some double acting and some single acting. The hydraulic fluid, such as oil, is pumped from the reservoir into the cylinder to move the piston and the piston rod, and as the piston and rod reciprocate during the functioning of the cylinder, the fluid is alternately pumped into the cylinder and returned from the cylinder to the reservoir. Such hydraulic systems are well known in the art, and need no further explanation.

It is also well known that such devices and systems, being under constant pressure, develop leaks at or around those portions of the devices which are contacted by the pistons and the piston rods. This is undesirable because leakage may seriously affect the efficiency of the devices because loss of the fluid will diminish the capability of the device to do the work for which it is designed, and when enough fluid has leaked out, the pump of the device will be moving against reduced pressure, and will burn out.

It is also true that loss of fluid, through leakage, is costly because the fluid must be replaced, and because the area around the device must be continuously cleaned for reasons of maintenance and safety.

A most important reason for providing a non-leak system for hydraulic devices relates to such devices as may be used in the brake system of an automobile. In such a device, a relatively small amount of fluid is used, and loss of even a small portion may seriously affect the braking system.

It is, therefore, an object of this invention to provide such a non-leak piston system in which provision is made for the return of any hydraulic fluid which should leak out of the actuating cylinder during the operation of the device back to the reservoir for the hydraulic fluid, or back into the actuating cylinder.

It is a further object of this invention to provide a piston seal system having a chamber or trap outside of the main cylinder of a hydraulic device in which leakage of hydraulic fluid may be collected and returned to the reservoir of the device.

It is also an object of this invention to provide means in hydraulic devices where leakage from the driving cylinders or actuating cylinders can be collected in confined spaces at low pressure and returned to either the reservoir or the actuating cylinder.

These objects as well as the advantages of the invention are obtained with the devices illustrated in the accompanying drawings in which:

FIG. 1 is a medial cross sectional view of a double acting actuator with the piston and piston rod in lowered position;

FIG. 2 is a view similar to FIG. 1 showing the piston and piston rod in raised position;

FIG. 3 is a view similar to FIGS. 1 and 2 showing an alternate form of actuator construction utilizing the single acting principle; and FIG. 4 is a medial cross sectional view of a pump incorporating the principles of my invention.

Similar numerals refer to similar parts throughout the several views.

Leakages usually occur in the actuator of a hydraulic system at the point where the piston rod reciprocates through the device. The hydraulic fluid will leak or seep through this opening around the rod and leave the actuating cylinder, and this type of leak usually occurs under high pressure.

I have, therefore, devised a low pressure chamber to be built around the piston rod outside of the main actuating cylinder. The leakage, when it occurs, will be trapped into the low pressure chamber and then returned either to the actuating cylinder or to the reservoir. Thus, in effect, although my invention does not absolutely eliminate leakage through piston seals, it effectively eliminates the loss or leakage of fluid from the hydraulic system.

The invention is incorporated in a double acting actuator such as illustrated in FIGS. 1 and 2 of the drawings as follows:

A cylinder housing 10 made of any suitable material such as steel, forms a cylinder 11. Instead of the usual stuffing box provided to enclose such cylinders with provision for a piston rod to reciprocate therethrough, I have provided a novel arrangement comprising a cylinder end insert 12 having a trap chamber 13 and a trap chamber closure 14. The cylinder end insert 12 may be maintained in the cylinder by any means known to the art such as by means of threads 15 as shown in the drawings. The trap end closure 14 slide fits into trap chamber 13, and is provided with an annular shoulder 16 and a neck 17. Stop means such as a slide nut 18 is adapted to fit over the neck 17 of trap end closure 14, and maintains the slideable trap chamber closure 14 in its proper reciprocating position, being threaded into the cylinder end insert 12 at threads 19. Since the cylinder end insert 12 is maintained in fixed position at the upper end of the cylinder 11, and the slideable trap end closure 14 reciprocates with relation to the cylinder end insert 12, the trap chamber 13 is of variable capacity depending on the position of the end closure 14. Reference to FIG. 1 of the drawings shows that when trap end closure 14 is completely within cylinder end insert 12, trap chamber 13 has diminished to zero capacity, and is theoretically nonexistant. Reference to FIG. 2 of the drawings shows that when trap end closure 14 is in raised or extended position, space will be provided between it and insert 12 which forms the trap chamber 13 at its largest capacity.

Fixed cylinder end insert 12 is provided with a central annular opening 20, and trap end closure 14 is provided with annular openings 21 and 22 through which a piston rod may be slideably reciprocated as is well known in the art. Various seals such as O-rings made of rubber, leather, plastic or similar material are provided to substantially prevent leakage through the operation of the device. For example, seals 23, 24 and 25 are provided in suitable annular rings cut into cylinder end insert 12, and seals 26 and 27 are provided in annular rings or cuts made in trap end closure 14. Further seal means 28 are provided around the piston 29.

The device also has a piston rod 30 which is attached to a coupling 31. The coupling 31 may then be attached to any other mechanism which the actuator is designed to move or operate.

Trap end closure 14 has an outwardly or upwardly facing engaging surface 32, and it is faced toward an engaging surface 33 which may be in the form of an extending shoulder on coupling 31, or may be in the form of a shoulder formed on the piston rod, or may be supplied in any other manner suitable to the device. The purpose of these facing and engaging surfaces 32 and 33 will be explained in the operation of the device hereinbelow.

I have provided an annular groove 34 around cylinder insert 12 for the purpose of collecting any hydraulic fluid which may leak from cylinder 11 at periphery 35 of cylinder insert 12. While I have shown element 34 as an annular groove, it may be any type of fluid collecting means suitable for the purpose, and in fact, may be referred to as leak collecting means. I also provide communicating means such as passageways or channels 36 and 37 between trap chamber 13 and leak collecting means 34. The piston 29 is actuated by hydraulic fluid pumped through access means such as hydraulic fluid lines or hoses 38 and 39 which are connected to the usual pumping means (not shown). Line 38 enters the cylinder at point 40, and line 39 joins line 41 which enters the cylinder at point 42, and line 39 also joins line 43 which enters the cylinder end insert 12 at point 44, and is connected to passageway or channel 37 through a one-way check valve 45.

During the normal operation of the device, the greatest part of leakage, if any, will take place through annular opening 20 in which piston 30 reciprocates. This leakage will be collected in trap chamber 13, and through the operation of the invention, as will be described hereinbelow, will eventually be forced through check valve 45 into pipe or line 43, and back to the pump or reservoir of the device. It is to be understood that check valve 45 permits flow only in the direction of the arrow in FIGS. 1 and 2 of the drawings. While the check valve shown comprises a ball and spring, it may be any type of check valve known to the art.

I have also provided a helical spring 46 around cylinder rod 30 seated against a portion of cylinder end insert 12 at one end and seated against the trap end closure 14 at the other end. The purpose of helical spring 46 is to maintain trap end closure 14 with shoulders 16 against nut 18 to provide for maximum capacity of trap chamber 13. This is designated as the extended position of trap end closure, and is illustrated in FIG. 2 of the drawings.

The purpose of engaging surfaces 32 and 33 are to force trap end closure 14 against the pressure of spring 46 so that its lower end 47 will contact the trap chamber surface 48 which is also a portion of cylinder end insert 12 in order to diminish the capacity of trap chamber 13 as close to theoretical zero as possible. This is illustrated in FIG. 1 of the drawings. Engaging surfaces 32 and 33 will engage to produce this result when piston 29 is at the innermost end of its cycle, and the relative distance between shoulder engaging surface 33 and piston 29 should be ascertained for each installation to provide for this function.

*Operation of the device*

Through a suitable pumping and valve arrangement well known to the art and not shown, oil is pumped through line 39 to fill lower end of actuator cylinder 11. This forces piston 29 upwardly. The oil pressure also goes through line 43. However, it is effectively checked by check valve 45 and will not normally enter the system at that point. During the upward thrust of the piston 29 and piston rod 30, the oil or hydraulic fluid which may be in the upper part of cylinder 11 flows out through line 38. This reduces the pressure in the upper part of the cylinder, and effectively reduces leakage during this phase of the cycle.

Now the device is in position as shown in FIG. 2 of the drawings. Oil is then pumped from line 38 through point 40 into cylinder 11 at the upper portion thereof causing oil pressure to move the piston 29 and piston rod 30 downwardly, and at the same time the oil in the lower end of actuating cylinder 11 flows out through point 42 and through line 41 to line 39 and back to the pump or reservoir under low pressure. It is at this phase of the cycle that the low pressure is at lower end of actuating cylinder 11, and the high pressure is at the upper end of actuating cylinder 11 between piston 29 and cylinder end insert 12. During this phase of the operation, severe leakage may occur through annular opening 20 and around periphery 35. These leakages will be caught in trap chamber 13 and leak catching or liquid catching means 34 respectively. Toward the end of this phase of the operation of the device, engaging surfaces 32 and 33 will contact, forcing trap end closure 14 against the pressure of spring 46 to move surfaces 47 and 48 together, resulting in the diminishing of the internal area of trap chamber 13. This causes an internal pressure which is substantially lower than the pressure existent in actuating cylinder 11, and forces all of the leakages upwardly through line 50, through check valve 45, through line 43, back to the pump or reservoir. Of course, there may always be some quantity of fluid in that part of the system comprising trap chamber 13, leak catching means 34, passageways 36 and 37 and line 50. However, this will be a minimal amount of fluid compared to the volume of fluid used throughout the whole system, and for all practical purposes, this invention eliminates loss of hydraulic fluid.

Of course, as the actuator continues working, it goes through the same cycles of the spring 46 pushing the trap end closure to its extended position, and the engaging surfaces 32 and 33 returning it to the second position which we shall call the compressed position.

While I have described this system and have used the term upper portion of actuating cylinder 11, it is to be understood that this is for purposes of providing a frame of reference only since in a device where the piston rod would be at the lower portion, the term "upper" would then be synonomous with the term "lower."

It is to be further understood that seal 27 will effectively prevent leakage of fluid from trap chamber 13 to the outside of the device because the fluid which may be in trap chamber 13 is always under relatively low pressure, and at no time is in the device under the high pressures reached in the actuating cylinder 11.

I have provided a similar piston seal system for a single acting actuator 60 as illustrated in FIG. 3 of the drawings. In this form of the device, there is an actuating cylinder 61 and a ram 62. The single acting cylinder 60 has the usual type of retaining rings and seals designated by reference numerals 63 and 64, and a cylinder end insert 65 which serves the same purpose as cylinder end insert 12 of the first mentioned form of the device.

In the case of a single acting actuator 60, there is only one hydraulic supply line 66. This is connected to a line 67 which enters the cylinder at point 68, and also to a line 69 which enters the cylinder end insert 65 through a check valve 70 at point 71. In all other respects, the mechanism of the invention is identical to that shown in FIGS. 1 and 2 of the drawings, and operates in the same manner.

I have shown check valve 70 outside of the device in FIG. 3 of the drawings as an alternate method of mounting the check valve for easier maintenance. However, this is optional, and is not critical to the invention. In operation, the single acting actuating cylinder 60 goes through a pressure phase and a gravity phase. During the pressure phase, hydraulic fluid is pumped through line 66, through line 67, into opening 68, into actuating cylinder 61. The extremely high pressure forces the ram 62 upwardly, and it is during this phase where leakage may occur through the seals 64 into trap chamber 13. During the gravity phase, oil is permitted to flow from actuating cylinder 61 back through point 68, pipe 67 and pipe 66 to the pump or reservoir. The ram 62 will lower, and engaging surfaces 32 and 33 will contact causing the leakage to be returned through point 71, into check valve 70, down line 69, through line 66 and back to the reservoir.

In FIG. 4 of the drawings, I show a form of hydraulic fluid pump incorporating a modified form of my trap chamber construction. The pump 80 has a cylinder 81, a pump rod 82 and a piston 83. Above the piston 83 there is a trap chamber 84 which is connected to cylinder 81 by means of a line or passage 85 through a check valve 86. There are also O-ring seals 87 and 88 to aid in preventing leakage around the periphery of piston 83, and an O-ring seal 89 around the pump rod 82 to aid in preventing leakage through that portion of the device. The pump rod is moved by any power means known to the art so that it will reciprocate upwardly and downwardly with relation to the position of the pump as shown in FIG. 4 of the drawings. Normally in a pump of this type, leakage will occur during the high pressure downward phase of the cycle. The hydraulic fluid will leak from cylinder 81 up toward trap chamber 84. Unless means is provided for returning this leakage to the cylinder, it will eventually be forced out through seal 89. This is highly undesirable. Through the operation of passage or line 85 and check valve 86, I have provided the means for returning the oil from trap chamber 84 to cylinder 81. When piston 83 is in the upstroke phase, the pressure in trap chamber 84 will greatly exceed the pressure in cylinder 81. For our purposes, we might even say that cylinder 81 would be equivalent to a vacuum chamber. Thus, the amounts of leakage in trap chamber 84 will be effectively drawn through line 85, through check valve 86 and returned to cylinder 81. On the downstroke, check valve 86 will prevent leakage through it and line 85. It will be appreciated that as the cycle continues, any leakage past the piston 83 will be returned to cylinder 81.

In addition to the vacuum pressure which is exerted, as described hereinabove, the pump 80 is designed so that upper surface 90 of piston 83 will actually meet inner end 91 and completely diminish the area within trap chamber 84 to theoretical zero. This action in and of itself will force the leakage back as described hereinabove.

The following advantages are obtained in the constructions described hereinabove. First of all, there will be no loss of hydraulic fluid. Secondly, damage due to dirt and debris entering the device is reduced to a minimum for the following reasons. In the usual type of device old in the art, the cylinder rod emerges from the cylinder through a stuffing box which has an opening subjected to the extreme high pressures of the operation of the actuating cylinder. Since this opening communicates with the outside of the device and dirt may come in, the dirt will grind into the working parts under extremely high pressure.

In the device of my invention, on the other hand, the openings to the outside are from the trap chamber to the outside rather than from the actuating cylinder to the outside. The trap chamber is never under high pressure, and thus, any dirt which may enter will be in a low pressure area greatly minimizing damage to the device and facilitating cleaning of the device. As a result, the outer seals, such as seals 27, will not have the usual high pressure abrasive action against them, and will last much longer than seals used on prior art devices. The inner seals 23, 24 and 25 will be effectively removed from the area where the dirt enters the device and, therefore, will last much longer.

While I have described my invention in its preferred forms, there are other forms which it may take without departing from the spirit and scope of the invention, and I, therefore, desire to be protected for all forms coming within the scope of the claims hereinbelow.

Wherefore I claim:

1. A leak catch seal for a fluid operated cylinder and piston rod comprising an end insert for the said cylinder adapted to be fixedly mounted into an end of the said cylinder to form a seal to inhibit the passage of fluids; a reciprocating piston rod slidably mounted through at least one opening in said insert; leak catch means formed between the perimeter of said insert and the inner walls of the said cylinder; said insert having a chamber centrally located therein to form a fluid trap means; a trap closure adapted to slide fit along said piston rod and within said chamber to enclose said fluid trap means; closure engaging means disposed on an outer portion of the said piston rod in faced relationship with the said trap closure; and at least one fluid communicating means between the said leak catch means and said trap means.

2. The seal of claim 1 further comprising an additional fluid communicating means communicating said trap means with a fluid reservoir for the cylinder, said additional fluid communicating means including a one-way check valve member.

3. The seal of claim 1 further comprising spring means seated within the said chamber and acting against the said trap closure, and stop means on said insert to limit the slide of the said trap closure.

4. The seal of claim 1 wherein said leak catch means is in the form of at least one annular groove extending around said insert.

5. A non-leak cylinder-piston system comprising a cylinder closure adapted to be mounted in the cylinder and having an opening for guiding a piston rod, and a chamber communicating with said opening; a slide fit closure for said chamber having an opening to accommodate said piston rod in a slide fitting relationship; a fluid communicating line disposed within said cylinder closure and connecting said chamber with at least one portion of a peripheral edge of said cylinder closure which edge would normally be in faced contact with a side wall of a cylinder when installed therein; slide closure engaging means adapted to be positioned on an outer portion of said piston rod; and additional fluid communicating means connecting said chamber to a fluid supply reservoir.

6. The non-leak piston system of claim 5 further comprising spring means seated within the chamber and acting against the said slide fit closure, and stop means on the said cylinder closure to limit outward movement of the said slide fit closure.

References Cited by the Examiner

UNITED STATES PATENTS

| | | | |
|---|---|---|---|
| 570,726 | 11/1896 | Butts | 92—86 |
| 2,328,438 | 8/1943 | Ernst | 91—422 |
| 2,435,527 | 2/1948 | Arpin | 103—178 X |
| 2,761,425 | 9/1956 | Bertsch et al. | 92—82 |
| 2,815,737 | 12/1957 | Gold et al. | 92—86 X |
| 2,988,058 | 6/1961 | Warnecke | 92—28 |

FOREIGN PATENTS 1,125,573   7/1956   France.

MARTIN P. SCHWADRON, *Primary Examiner.*

EDGAR W. GEOGHEGAN, *Examiner.*

I. C. COHEN, *Assistant Examiner.*